United States Patent [19]

Taniguchi et al.

[11] Patent Number: 4,712,878
[45] Date of Patent: Dec. 15, 1987

[54] COLOR IMAGE FORMING APPARATUS COMPRISING FERROELECTRIC SMECTIC LIQUID CRYSTAL HAVING AT LEAST TWO STABLE STATES

[75] Inventors: Osamu Taniguchi; Shinjiro Okada, both of Kawasaki; Yujiro Ando, Yokohama, all of Japan

[73] Assignee: Canon Kabushiki Kaisha, Tokyo, Japan

[21] Appl. No.: 819,400

[22] Filed: Jan. 16, 1986

[30] Foreign Application Priority Data

Jan. 18, 1985 [JP] Japan .............................. 60-006716
Jan. 18, 1985 [JP] Japan .............................. 60-006717

[51] Int. Cl.⁴ ........................................... G02F 1/13
[52] U.S. Cl. ........................... 350/350 S; 350/331 R; 350/336; 350/339 F
[58] Field of Search .............. 350/331 R, 336, 339 F, 350/350 S, 351

[56] References Cited

U.S. PATENT DOCUMENTS

| 3,578,844 | 5/1971 | Churchill et al. | 350/351 |
| 3,734,597 | 5/1973 | Churchill et al. | 350/351 |
| 4,470,669 | 9/1984 | Kubota et al. | 350/350 S X |
| 4,499,458 | 2/1985 | Le Berre et al. | 350/350 S X |
| 4,593,978 | 6/1986 | Mourey et al. | 350/350 S X |
| 4,603,945 | 8/1986 | Fergason | 350/336 X |
| 4,643,533 | 2/1987 | Armitage | 350/350 S |

OTHER PUBLICATIONS

Tsai, R. C., "High Data Density Four-Color LCD," *Optical Engineering* (May/Jun. 1982), vol. 21, No. 3, pp. 565–568.

*Primary Examiner*—Stanley D. Miller
*Assistant Examiner*—Richard F. Gallivan
*Attorney, Agent, or Firm*—Fitzpatrick, Cella, Harper & Scinto

[57] ABSTRACT

An image-forming apparatus, comprising: a liquid crystal cell comprising an electroconductive member, an electric charge-accepting member, and a ferroelectric liquid crystal interposed therebetween; charging means for imparting an electric charge to the electric charge-accepting member sufficient to form an electric field exceeding the threshold voltage of the ferroelectric liquid crystal; and a multi-color optical filter disposed in the neighborhood of the electroconductive member and comprising a plurality of filter elements of which adjacent ones have mutually different spectral characteristics.

17 Claims, 9 Drawing Figures

⊙ Ea
⊗ Eb

4,712,878

COLOR IMAGE FORMING APPARATUS COMPRISING FERROELECTRIC SMECTIC LIQUID CRYSTAL HAVING AT LEAST TWO STABLE STATES

FIELD OF THE INVENTION AND RELATED ART

The present invention relates to an apparatus for image formation and more particularly to an apparatus for color image formation using a ferroelectric smectic liquid crystal having at least two stable states.

Liquid crystal devices have heretofore been used in the fields of display, optical shutters and the like because they provide apparatus in a small size, in a thin form and with a low power consumption. Especially, in the field of display, there has been rapid progress based on several noticeable inventions. For example, the application of TN (twisted nematic) liquid crystals have been known, as described in "Voltage-Dependent Optical Activity of a Twisted Nematic Liquid Crystal" by M. Schadt and W. Helfrich, Applied Physics Letters, Vol. 18, No. 4 (Feb. 15, 1971), pp. 127–128. Liquid crystal devices used in the field of display generally have an X-Y matrix electrode structure in order to arrange image display elements (picture elements) in the form of a matrix.

As a method for driving such a display device, there has been generally adopted a time-division driving method wherein address signals are sequentially, periodically and selectively applied to scanning electrodes, and predetermined information signals are applied to signal electrodes. However, when the number of picture elements is increased in the display device or the driving method, the duty ratio is decreased, thus resulting in lowering of image contrast and occurrence of cross-talk. Moreover, in order to reduce the size of picture elements and obtain an improved resolution, it is necessary to arrange the matrix electrodes and connect them with lead wires at a high packaging density, whereby manufacture of the devices becomes complicated.

Another display system is disclosed, e.g., by T. P. Brody, Juris A. Asars and G. Douglas Dixon, IEEE Transactions on Electron Devices, Vol. ED-20, (No. 11, Nov. 1973), pp. 995–1001, "A 6×6 Inch 20 Lines-per-Inch Liquid Crystal Display Panel", wherein respective picture elements are provided with a thin film transistor (TFT) and switched one by one. In this system, however, the provision of TFT to respective picture elements is complicated, and considerable improvement is desired in respect to production cost.

On the other hand, in order to obviate the difficulties of arranging electrodes and lead wires connected thereto at a high density which are common to a system wherein image signals are applied to a liquid crystal from electrodes disposed on a pair of base plates, there have been proposed some systems wherein image signals are applied from outside the base plates. One such system is a heat-scanning system using, for example, laser with long wave-lengths. This systems, however, requires a high power output laser and is not adapted for a direct display on a large picture area because a long time is required for writing. As a result, this system can only be applied to a projection type display apparatus. Further, there is also a method wherein an electron base is used for writing. This method is however accompanied with such defects, as in a method using CRT, that high resolution cannot be obtained because of spreading of the electron beam and that the apparatus requires a large length behind the display face.

In order to solve the above-mentioned problems accompanying the apparatus of the prior art, our research group has already proposed an image-forming apparatus comprising a liquid crystal cell and charging means disposed outside the cell (U.S. patent application Ser. No. 683,862). More specifically, the image forming apparatus is characterized by comprising a liquid crystal cell having a pair of base plates and a liquid crystal layer interposed between the base plates, and a means for applying to the liquid crystal layer an electric field exceeding a threshold value. The outline of the image forming apparatus is now explained with reference to FIG. 1.

A liquid crystal device (cell) 101 is one of a reflection type, wherein a dielectric mirror 202 is disposed.

When a signal voltage corresponding to a digital image signal is applied to an ion-generator 109, an imagewise ion beam is generated and a charge-accepting member 104 is irradiated therewith. A liquid crystal 107 has been brought to one of the bistable states (first stable state), and a portion thereof indicated by a reference numeral 111 which is irradiated with the ion-beam is caused to assume another stable state (second stable state).

Projecting beams 112a, 112b and 112c are irradiated through a polarization beam-splitter 103 to the liquid crystal device 101, whereby the image recorded in the liquid crystal layer 107 is projected onto a projection screen 113. The polarization direction of the polarization beam splitter 103 is made parallel or perpendicular to the direction of alignment of the liquid crystal 110 placed in the first stable state, and projection light beams 112a, 112b and 112c are referred to as polarized beams of P component. The light beams 112a, 112b and 112c are irradiated through the polarization beam splitter to the liquid crystal device 101 as they are polarized beams of P component. Among the polarized beams of P component, beams 112a and 112c are transmitted through portions 110 of the liquid crystal oriented to the first stable state, reflected by the dielectric mirror 102 and transmitted again through the polarization beam splitter 103 as they are polarized beams of P component.

On the contrary, among the polarized beams of P component, projection beam 112b is transmitted through the portion 111 of the liquid crystal oriented to the second stable state, reflected by the dielectric mirror, and modulated into a polarized light beam containing S component, of which only the S component of the polarized beam is reflected by the polarization beam splitter 103 to be a beam 112bb which is then projected onto the projection 113, whereby the image recorded in the liquid crystal device is projected onto the projection screen 113.

SUMMARY OF THE INVENTION

The present invention relates to an improvement in the above-mentioned image-forming apparatus and more specifically aims at providing an image forming apparatus adapted for formation of multicolor images.

According to the present invention, there is provided an image forming apparatus, comprising: a liquid crystal device of a cell structure comprising an electroconductive member, an electric charge-accepting member, and a ferroelectric liquid crystal interposed between the electroconductive member and the electric charge-accepting member, charging means for imparting an electric charge to the electric charge-accepting member sufficient to form an electric field exceeding the threshold voltage of the ferroelectric liquid crystal between the electric charge-accepting member and the electroconductive member, and a multi-color optical filter disposed in the neighborhood of the electroconductive member and comprising a plurality of filter elements of which adjacent ones have mutually different spectral characteristics.

These and other objects, features and advantages of the present invention will become more apparent upon a consideration of the following description of the preferred embodiments of the present invention taken in conjunction with the accompanying drawings, wherein like parts are denoted by like reference numerals throughout the figures.

DETAILED DESCRIPTION OF PREFERRED EMBODIMENTS

Figure 2:
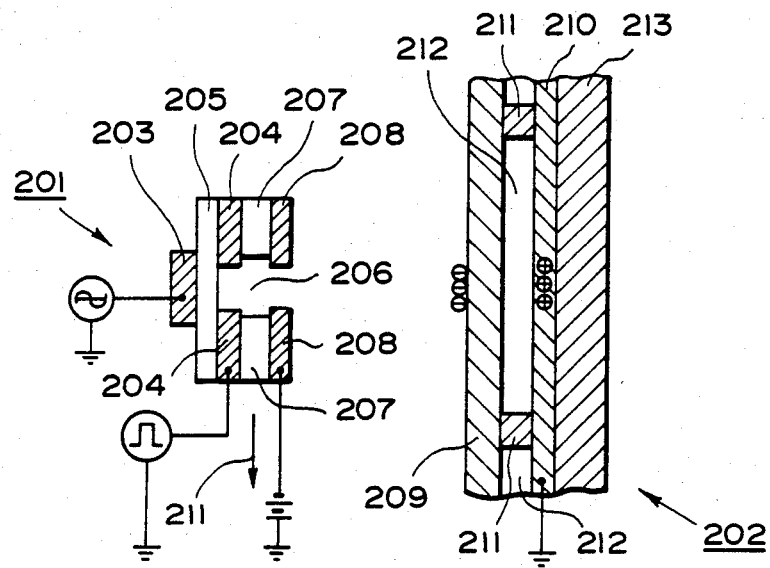
FIG. 2 is a partial schematic sectional view of an image forming apparatus for illustrating a charge-imparting mode used in the present invention.

FIG. 2 is a partial schematic sectional view of an embodiment of the image forming apparatus for illustrating a function of an ion-generator as an example of the charge-imparting means used in the present invention.

Figure 1:
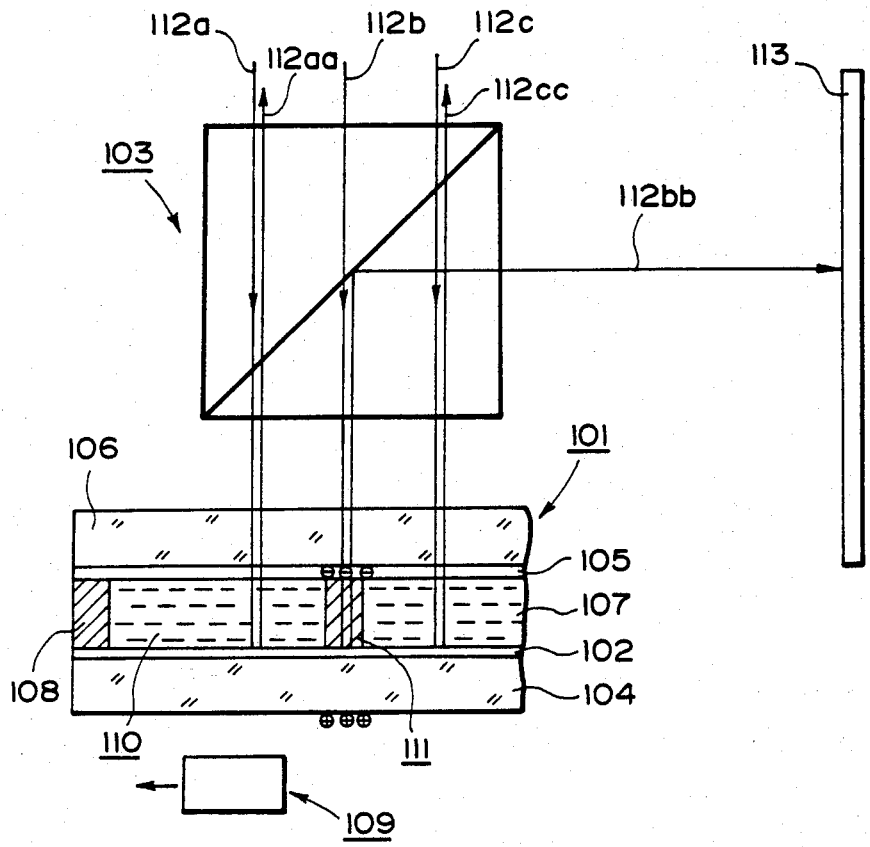
FIG. 1 is a sectional view of an image forming apparatus (reflection-type) which has been proposed by our research group.

An ion-generator 201 shown in FIG. 2 is similar to the ion-generator 109 shown in FIG. 1 and may be one disclosed in, for example, Japanese Patent Laid-Open Application No. 78134/1979, U.S. Pat. Nos. 4,195,927, 4,267,556 and 4,160,257, Canadian Pat. No. 1,120,992 and Japanese Patent Publication No. 35874/1981.

The ion generator 201 is operated by applying a high AC voltage to an electrode 203 and causing gaseous discharge because of an electric field generated between the electrode 203 and an electrode 204, whereby an insulating layer 205 is charged and discharged. Thus, by charging and discharging the insulating layer 205, a source of positive or negative ions is formed at an aperture 206 of the electrode 204. An electrode 208 for selectively emitting ions is provided on the electrode 204 through an insulating member (spacer) 207 for giving a predetermined gap.

A DC voltage is applied between the electrode 208 and an electrode 210 serving as counter-electrode of the ion-generator 201 and formed on a base plate 213 of, e.g., glass, plastic, etc., of the liquid crystal device 202, ions are emitted from the aperture 206 toward an electric charge-accepting member 209. In this instance, by selecting the direction of the electric field between the electrodes 204 and 208, either positive or negative ions are selectively directed toward the electrode 208. Between the electrodes 208 and 210, only either positive or negative ions are emitted toward the electrode 210 because of the DC electric field. Accordingly, by applying a signal voltage to the electrode 204 corresponding to a digital image signal, ions are irradiated imagewise onto the charge-accepting member 209 and a charged image is formed thereon.

In the ion-generator 201, one picture element may be formed by one aperture 206. Accordingly, if a large number of apertures 206 are arranged in the thickness direction of the drawing to form an aperture array and the aperture array is moved in the direction of an arrow 211, imagewise charges are imparted onto the entire surface of the liquid crystal device facing the ion-charger 201 of the liquid crystal device 202. Formation of imagewise charges on the liquid crystal device can also be effected by using an ion-charger having apertures arranged in a matrix and in parallel with the liquid crystal device. In this case, however, a large number of apertures are required corresponding to the required number of picture elements on the liquid crystal device and an increased number of driving elements are required correspondingly. In contrast thereto, when the ion generator having apertures disposed in an array shown in FIG. 2 is used, the number of apertures is remarkably reduced. Moreover, by adopting a matrix driving scheme between the AC voltage applied to the electrode 203 and the image signal voltage applied to the electrode 204, the number of driving elements is remarkably reduced.

The charge-accepting member 209 may be formed of a film or thin plate of a plastic such as polyimide and polyamide or an inorganic insulating material such as mica and glass. Because of electrostatic charges (e.g., negative ones as shown in the figure with ⊖) formed on the charge-accepting member 209 and charges induced thereby in the electrode 210 (e.g., positive ones as shown in the figure with ⊕), an electric field is applied to the liquid crystal layer 212, whereby the orientation direction of the liquid crystal is changed.

Between the liquid crystal layer 212 and the charge-accepting member 209 or between the liquid crystal layer 212 and the transparent electrode 210 may be formed an orientation-controlling film (not shown) which may be a film of an inorganic material such as SiO, $SiO_2$ and $TiO_2$ or a film of an organic compound such as polyimide, polyamide, polyvinyl alcohol and polyester and may also function as an insulating film when it is formed on the transparent electrode 210.

The intensity of the electric field for causing the orientation may vary depending on the kind of liquid crystal used but may be of the order of $0.5-10\times10^6$ V/m which corresponds to the order of $1.5-44\times10^{-5}$ coulomb/$m^2$ in terms of electric charges to be imparted while it varies depending on the dielectric constants of the liquid crystal layer 212 and the charge accepting member 209.

The thickness of the charge-accepting member 209 does not remarkably influence the voltage distributed and applied to the liquid crystal layer 212 but may preferably be equal to or less than the size of a picture element, i.e., the diameter or size of the aperture 206, particularly one half or less of the diameter, because a large thickness can result in poorer resolution due to spreading of the electric field. More precisely, the thickness is desirably of the order of 30 microns or less where one picture element measures, for example, 60 microns in size. Because an electrostatic attraction operates between the charge-accepting member 209 and the electrode 210, it is desirable to dispose spacers in, e.g., stripe shape at a sufficient density to prevent deformation of the charge accepting member.

The portion of the spacer 211 is made black or in a light scattering state, depending on the display system adopted, so as not to result in a bad influence on the image display contrast. When the ratio between the pitch of the spacers 211 and the pitch of the picture elements is close to an integer, a moiré phenomenon (interference pattern) can occur. The phenomenon can be obviated by selecting appropriate pitch or angle of arrangement of the spacers 211 or arranging the spacers 211 at random.

The resistance of the charge-accepting member 209 can be as low as $10^{10}$ $\Omega$-cm, i.e., can be $10^{10}$ $\Omega$-cm or higher, when a liquid crystal having a memory characteristic such as a bistable smectic liquid crystal is used, because, in such a case, the charge-accepting member is required to hold charges thereon during a time period only required for changing the orientation of the liquid crystal. In this case, it is preferred that the charge-accepting member 209 is grounded or connected to a lower potential so that charges are not accumulated in the charge-accepting member.

When images are rewritten, the images may be erased according to various methods depending on the liquid crystal used. For example, the image written in the above described manner can be erased by applying a uniform electric field over the whole extension of the liquid crystal device. For this purpose, a separate corona-discharger for generating corona can be used to remove the charges or impart charges of a polarity opposite to that of the charges used for writing, or the ion-generator 201 can be used to apply erasure signals imagewise instead of the image signals used in the writing in such a manner that an ion-beam of a polarity opposite to that of the ion-beam used at the time of writing is used.

In the case where the orientation of a liquid crystal is changed by a certain amount of charge imparted from outside in a manner as described above, a ferroelectric liquid crystal is optimally used as the liquid crystal since it has a high impedance or resistivity of $10^{10}$ $\Omega$-cm or above, which is much higher than that of other available liquid crystals such as nematic liquid crystal, and can effectively prevent the leakage of charge. Such a ferroelectric liquid crystal includes chiral smectic liquid crystals, of which chiral smectic C-phase (SmC*), H-phase (SmH*), I-phase (SmI*), J-phase (SmJ*), K-phase (SmK*), G-phase (SmG*) or F-phase (SmF*) liquid crystal is suited. Further, the ferroelectric liquid crystal has at least two stable orientation states. Particularly when it has bistability, after it has been oriented to either one stable state by an electric field effect, the stable state can be retained even after removal of the electric field. Because of this property, the ferroelectric liquid crystal is particularly suitable for use in the present invention. These ferroelectric liquid crystals are described in, e.g., "LE JOURNAL DE PHYSIQUE LETTERS" 36 (L-69), 1975; "Ferroelectric Liquid Crystals": "Applied Physics Letters" 36 (11) 1980, "Submicro Second Bistable Electrooptic Switching in Liquid Crystals"; "Solid State Physics" 16 (141), 1981 "Liquid Crystal", etc. Ferroelectric liquid crystals disclosed in these publications may be used in the present invention.

Specific examples of the ferroelectric liquid crystal compounds are decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresocylidene-4'-octylaniline (MBRA8), etc.

The behavior of these ferroelectric liquid crystals under an electric field is basically as described by Clark and Lagerwall in U.S. Pat. No. 4,367,924 and may be briefly described as follows. When an electric field is applied to a layer of a ferroelectric liquid crystal, the liquid crystal molecules are aligned or oriented so that their dipole moments are in alignment with the direction of the electric field only when the electric field exceeds a certain threshold level determined by the liquid crystal layer, and the liquid crystal molecules assume either a first stable state or a second stable state depending on the direction of the electric field. The resultant stable state is retained until an electric field of the opposite polarity exceeding a threshold level is applied to the liquid crystal layer. Further, the first and second stable states have different polarization functions (birefringence effects), and the ferroelectric liquid crystal may be used as a display material by utilizing the difference in polarization function. The ferroelectric liquid crystal can be an excellent display material because of a high-speed responsive characteristic resulting from the above-mentioned interaction between the dipole moment and the electric field and the bistability providing a memory characteristic. In order to exhibit these characteristics effectively, the thickness of the liquid crystal layer is desirably as thin as possible and is suitably in the range of 0.5 to $20\mu$, particularly 1 to $5\mu$.

Figure 3A:
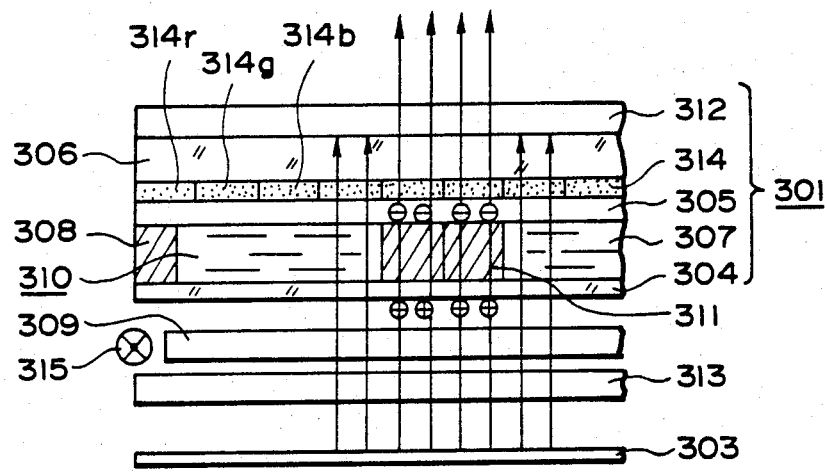
FIG. 3(a) and FIG. 5 are schematic sectional views respectively showing an embodiment of the present invention.

According to the present invention, there is used a multi-color (intended to mean two or more colors, herein) optical filter having filter elements of which adjacent ones have mutually different spectral characteristics. The color filter is disposed in the neighborhood of an electroconductive member (corresponding to the member 105 in FIG. 1 and the member 210 in FIG. 2) between the conductive member and a charge-accepting member sandwiching a ferroelectric liquid crystal layer of an image-forming apparatus as described above, thereby to form an image-forming apparatus adapted for color image formation. FIG. 3(a) shows an overall layer structure of an embodiment of the image-forming apparatus according to the present invention.

A liquid crystal device 301 as shown in FIG. 3(a) has a transmission type structure. The liquid crystal device 301 comprises a base plate 306 which in turn comprises a multi-color filter 314 having color filter elements 314r, 314g and 314b successively arranged in the form of stripes so as to be in parallel with the scanning direction of an ion generator described hereinafter and transparent electrodes of, e.g., ITO (indium-tin oxide), both disposed on one side of the base plate 306, e.g., by vapor deposition. On the other side of the base plate 306 is disposed a polarizer 312. The liquid crystal device 301 has a cell structure formed by the base plate 306, a charge-accepting member 304 of, e.g., a plastic material, and a liquid crystal layer sandwiched between the plate 306 and the member 304. The thickness of the liquid crystal layer 307 is kept constant at, e.g., 1 to 5μ by means of a spacer 308. Outside the charge-accepting member 304, an ion generator 309 is disposed, and further outside are disposed a polarizer 313 and an illuminating light source 303. As the illuminating light source 303, an incandescent lamp may conveniently be used, or a fluorescent lamp or an array of LEDs (light emission devices) may also be used.

The operation of the apparatus will now be described. Prior to image formation, the whole surface of the charge-accepting member 304 is irradiated with a negative ion-beam from an ion-generator 309 to be given an uniform negative charge, by which a voltage Eb is applied to the liquid crystal layer 307. If the voltage Eb thus given is larger than the threshold voltage of the liquid crystal, the liquid crystal is oriented to its first stable state as shown by reference numeral 310 in FIG. 3(a).

A pair of polarizers 312 and 313 shown in FIG. 3(a) are arranged in the form of cross nicols with each other so that the polarizer 312, for example, is arranged to polarize the incident light in the direction of the longer axis of the liquid crystal molecules 310 oriented to the first state as described above. As a result, in this state, the incident light is not transmitted, whereby a "dark" state is displayed as a whole.

Subsequently, a positive ion-beam is irradiated imagewise from the ion-generator 309 to the charge-accepting member 304. In this instance, either the ion-generator 309 or the liquid crystal device is moved relative to the other, whereby the ion-beam can be scanned in the direction of an arrow 314 onto the charge-accepting member 504. (In this embodiment, the ion-generator 309 is moved relative to the liquid crystal device 301 in the direction of the thickness of the drawing as indicated by a symbol 315.) By the irradiation of the ion beam, positive charges (shown by ⊕ in FIG. 3(a)) are formed imagewise on the charge-accepting member 304 and an electric field Ea opposite to Eb is applied to the liquid crystal layer 307. If the voltage Ea exceeds the threshold voltage, a portion of the liquid crystal oriented to the first stable state 310 is re-oriented to the second stable state 311. The charge imparted to the charge-accepting member 304 gradually leaks to be extinguished and the voltage applied to the liquid crystal layer 307 is extinguished. In this example, however, the recorded image is retained because the ferroelectric liquid crystal 307 has a memory characteristic. In this liquid crystal phase 311, the longer axes of the liquid crystal molecules are deviated from the polarization directions of the polarizers 313 and 312 so that the polarized direction of the incident light is deviated from the polarization directions of these polarizers. Thus, the incident light is transmitted to provide a "bright" state and an image corresponding to the portion 311 of the liquid crystal layer is displayed.

In this instance, in the present invention, a transmitted light signal is obtained as a color signal because a color filter 314 is provided. The color filter 314 may be one for the additive color process comprising filter elements of three colors of red (R), green (G) and blue (B) formed in stripes in parallel with the scanning direction of the ion-generator 309 by a technique of photolithography on the substrate 306. The color filter 314 may also be one for the subtractive color process comprising filter elements of three colors of cyan (C), magenta (M) and yellow (Y) formed in a similar manner. The color filter can also be formed by dyeing a polymer film.

Figure 3B:
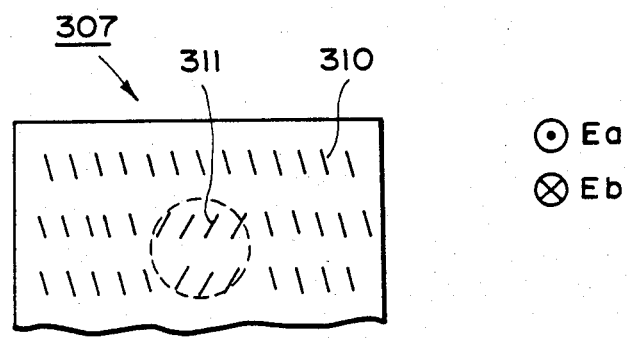
FIG. 3(b) is a plan view illustrating a change in orientation of the liquid crystal layer in an embodiment.
Figure 4:
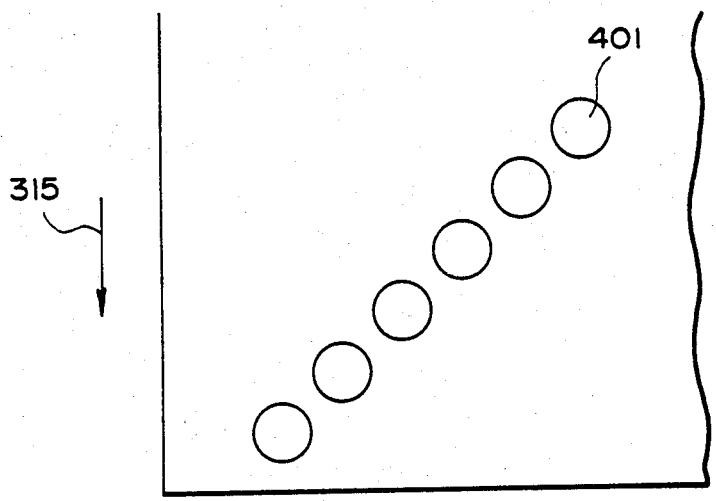
FIG. 4 is a conceptual view for illustrating a positional relationship between an ion-generator and a color filter.
Figure 4:
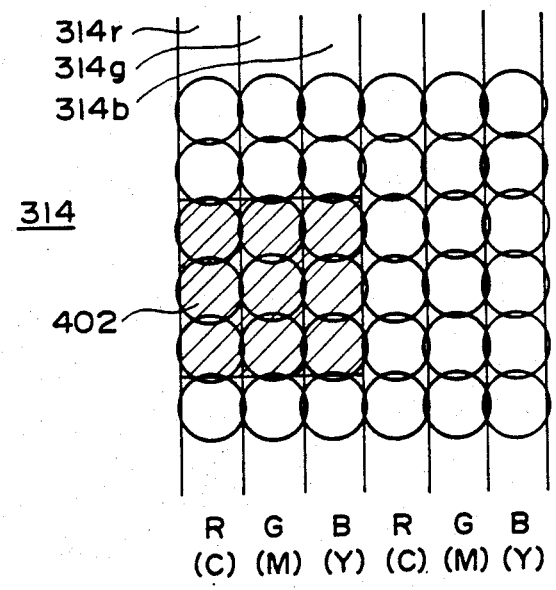

FIG. 4 shows an example of a positional relationship between the apertures of the ion-generator 309 and the respective color elements of the color filter 314 shown in FIG. 3. More specifically, in this example, each of the apertures 401 of the ion-generator is disposed to correspond to one of the respective color elements 314r, 314g and 314b. A dot size of an image formed by ions emitted from one aperture of the ion-generator is ordinarily of the order of 100 to 200μ, and the width of each color filter element is preferably made equal to or slightly smaller than the dot size. By arranging the color filter 314 in this way, color display can be effected by using, e.g., hatched 9 dots in FIG. 4 as one picture element. If desired, one picture element may be formed by total of three dots each allotted to one of three colors.

A signal for color image formation is applied by controlling an electric signal applied to the ion-generator to bring selected dots among, e.g., 9 dots of one picture element 402 as shown in FIG. 4 to the "bright" state.

An example of transmission type liquid crystal display apparatus, wherein an illumination light source is incorporated, has been explained with reference to FIGS. 3 and 4. However, a reflection-type display apparatus may also be formed by replacing the polarizers 312 and 313 with a dielectric mirror disposed on the charge-accepting member 304 and by disposing an optical modulation element such as a polarization beam-splitter outside the liquid crystal cell and on the other side from the dielectric mirror. As these elements are already used in the apparatus shown in FIG. 1, the structure of such a reflection type liquid crystal display apparatus according to the invention will be easily understood without specific illustration thereof by a figure.

Figure 5:
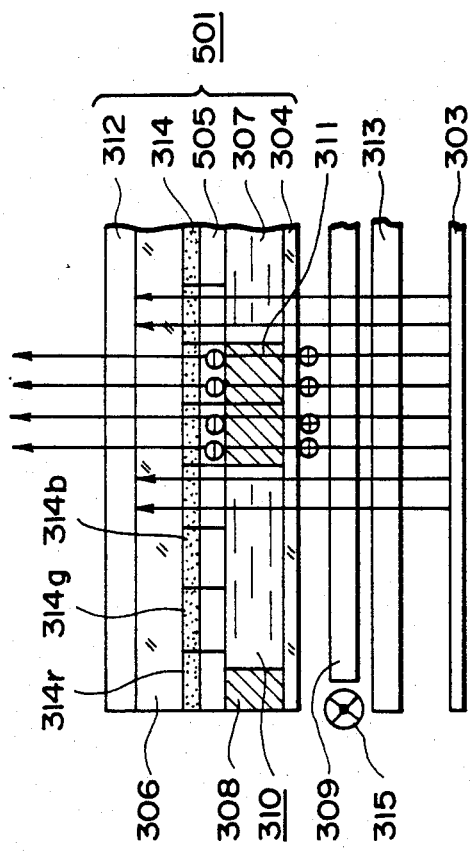

In another preferred embodiment according to the present invention, in addition to the use of a multi-color optical filter having multi-color filter elements as described above, the electroconductive member is divided or split into a plurality of conductive members corresponding to or in alignment with the filter elements to provide an image-forming apparatus adapted for color image formation. FIG. 5 shows an overall layer structure of an embodiment of the image forming apparatus according to this embodiment.

The liquid crystal device 501 shown in FIG. 5 has a structure similar to that of the device 301 shown in FIG. 3, except that split transparent electrodes 505 of, e.g., ITO formed by, e.g., vapor deposition are disposed in place of the transparent electrode 305 shown in FIG. 3(a) and in alignment with each of the color filter elements 314r, 314g and 314b.

Figure 6:
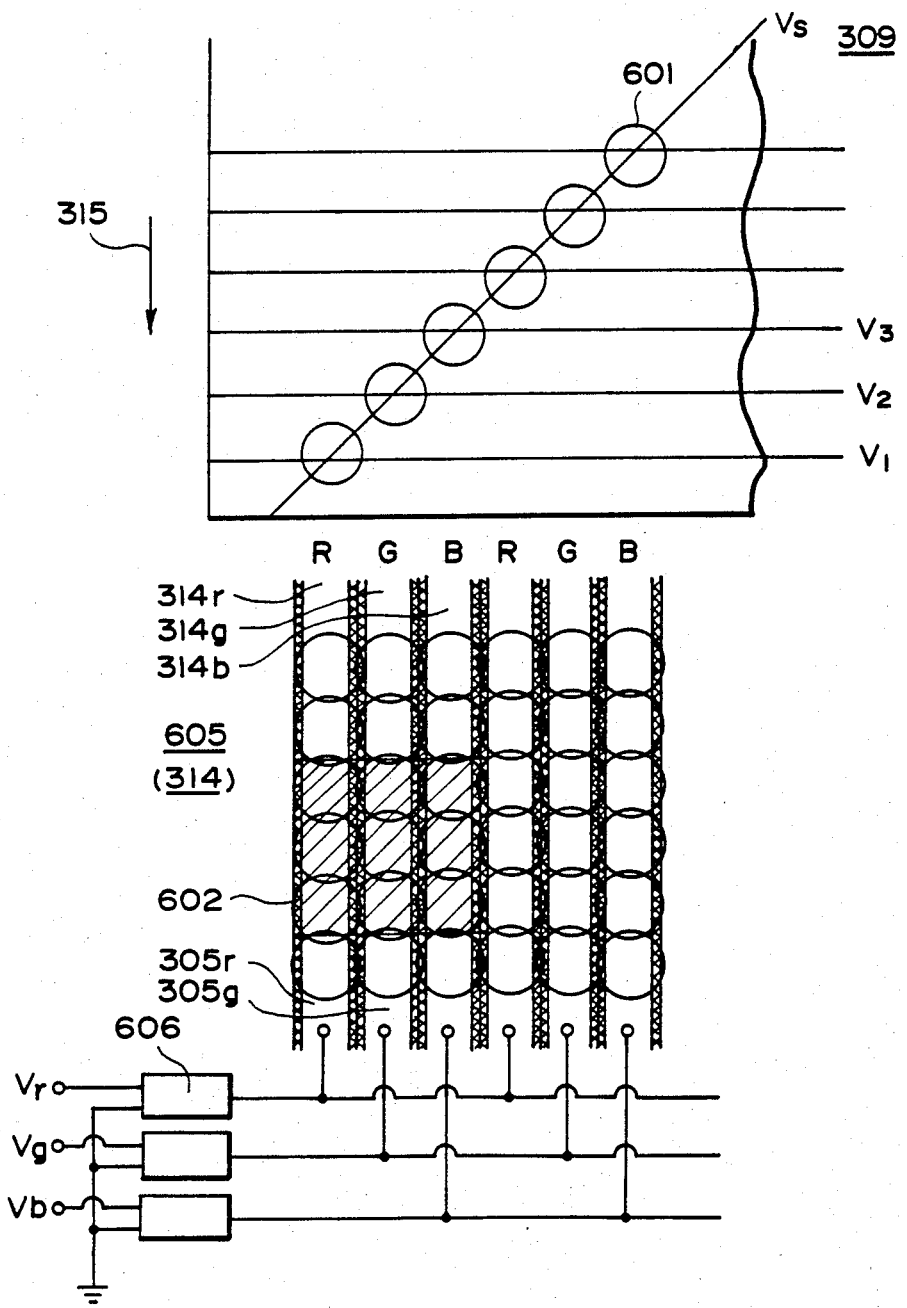
FIG. 6 is a conceptual view for illustrating a positional relationship among an ion-generator, a color filter and divided electrodes.

FIG. 6 shows an example of a positional relationship between the apertures 601 of an ion generator 309 as described above and the respective color elements 314r, 314g and 314b of the color filter 314. The size, arrangement and operation of the color filter elements are substantially the same as those explained with reference to FIG. 4.

Now, the reason for using the split electrodes disposed corresponding to the respective filter elements will be explained. In a case where a uniform electroconductive member is used as in the embodiment of FIG. 3, as the width of each color filter element is of the order of 150 μm, the tolerable positional deviation in dot disposition in the direction perpendicular to the scanning direction of the ion-generator should be of the order of 10 μm or less. Unless this level of precision is observed, a dot size steps over into a neighboring color filter element so that it is difficult to obtain a clear color image. The above-mentioned mechanical or physical precision is moderated by using split electrodes 505 respectively disposed corresponding to the color filter elements and by applying signals in a time division manner to neighboring electrodes. The split electrodes 505 inclusive of 505a, 505b, ... ) may be disposed as denoted inclusively by 605 in FIG. 6. Thus, leads to electrodes 505a, 505b, ... are connected in common for each color and the resultant three leads are connected to power supplies 606. Herein, the power supplies 606 are those generating different voltages depending on the presence or absence of pulse signals Vr, Vg or Vb and, more specifically, generate a voltage of a polarity for attracting ions only while pulse voltages are applied thereto.

Figure 7:
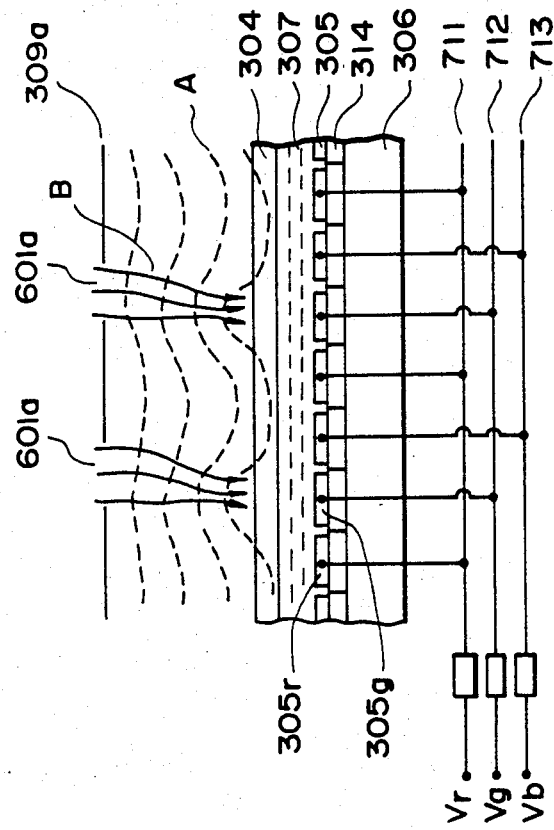
FIG. 7 is a conceptual schematic view for illustrating a state of ion guidance by divided electrodes.

FIG. 7 shows a behavior of ions guided to selected electrodes.

Referring to FIG. 7, ions are emitted from apertures 601a of the ion-generator 309a corresponding to image signals. When it is desired to impart ion-charges to portions of the charge-accepting member 304 corresponding to green color filter elements 314g, a pulse voltage Vg is applied to corresponding electrodes 505. In a case where ions issued from the apertures 601a have a positive polarity, a voltage which is more negative then those applied to leads 711 and 713 is applied to a lead 712. For example, 0 volt is applied to the leads 711 and 713, while −200 V is applied to the lead 712. As a result, equipotential planes as indicated by broken lines A are formed in a space in which the ions travel along lines B in FIG. 7. Thus, even if an ion-emitting aperture and a corresponding electrode are positionally deviated, ion-charges are surely imparted to the portion of the charge-accepting member 304 confronting the prescribed electrode. As will be understood from the above explanation with reference to FIG. 7, while the embodiment shown in FIG. 5 is provided with apertures each corresponding to one electrode which in turn corresponds to one of the respective color filter elements, it is possible to use only one ion aperture for one set of three color filter elements, as ions are deflected and guided as shown in FIG. 7 to an arbitrarily selected electrode to provide a charge onto the corresponding part of the charge-accepting member.

In the driving system using an ion-generator, it is not necessary to use a number of driving elements which is equal to the number of the apertures, but a matrix driving scheme may be adopted between the AC voltage signals Vi (i=1, 2, ...) as scanning signals applied to the electrodes 203 (FIG. 2) and image signal voltages Vsi (i=1, 2, ...) applied to the electrodes 204 (FIG. 2). In this instance, in order to obtain a color image, image signal voltages are applied in a time division manner for respective colors. Signal voltages Vr, Vg and Vb applied to respective switching circuits may be obtained in synchronism with image signal voltages Vs corresponding to respective colors, whereby charges are imparted to portions of the charge-accepting member corresponding to the respective color filter elements to form an image.

Figure 8:
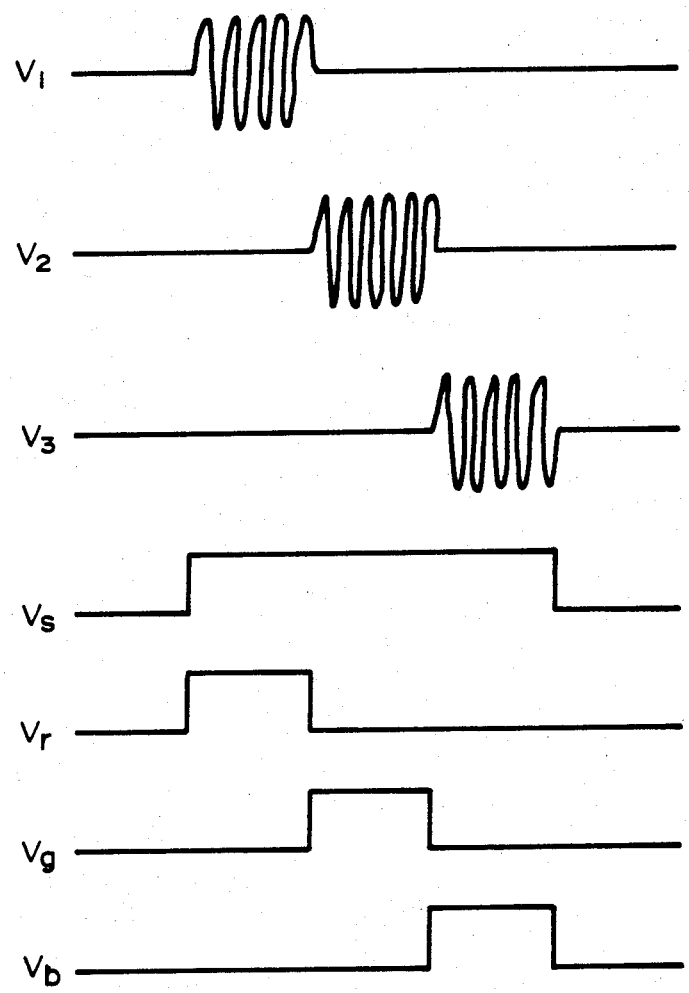
FIG. 8 shows an example of timing chart for providing three-color image signals to a picture element.

FIG. 8 shows an example of timing chart for applying all color signals of red, green and blue, for example, to one picture element 602 (in FIG. 6).

An example of transmission type liquid crystal display apparatus has been explained with reference to FIGS. 5 to 8. However, modification to a reflection type display apparatus may easily be effected like the embodiment explained with reference to FIGS. 3 and 4.

As described hereinabove, as an improvement for an image forming apparatus using a ferroelectric liquid crystal and a charge-imparting means such as an ion-generator for driving the ferroelectric liquid crystal, an image-forming apparatus capable or reliably effecting color image display adapted for a large picture display is provided by disposing a color filter having color filter elements disposed in positional correspondence with apertures of the ion-generator and further preferably using split electrodes disposed corresponding to the color filter elements.

What is claimed is:

1. An image-forming apparatus, comprising:
   a liquid crystal device of a cell structure comprising an electroconductive member, an electric charge-accepting member, and a ferroelectric liquid crystal interposed between the electroconductive member and the electric charge-accepting member,
   charging means for imparting an electric charge to the electric charge-accepting member sufficient to form an electric field exceeding the threshold voltage of the ferroelectric liquid crystal between the electric charge-accepting member and the electroconductive member, and
   a multi-color optical filter disposed in the neighborhood of the electroconductive member and comprising a plurality of filter elements of which adjacent ones have mutually different spectral characteristics.

2. The apparatus according to claim 1, which further comprises means for moving said charging means relative to said electric charge-accepting member.

3. The apparatus according to claim 2, wherein said filter elements are formed in stripes in parallel with the moving direction of the charging means.

4. The apparatus according to claim 1, wherein said electroconductive member is divided into a plurality of divided conductive members which are respectively disposed corresponding to said filter elements.

5. The apparatus according to claim 4, wherein said charging means successively generates charge patterns corresponding to different color signals, and in phase with the color signals, voltage signals are applied to the divided conductive members.

6. The apparatus according to claim 1, wherein said charging means is an ion-generator capable of generating ion-beams.

7. The apparatus according to claim 6, wherein said ion-generator comprises a plurality of apertures for generating ion-beams arranged in an array.

8. The apparatus according to claim 1, which further comprises means for detecting an optical difference between a light beam having passed through the ferroelectric liquid crystal oriented to the first orientation state thereof and a light beam having passed through the ferroelectric liquid crystal oriented to the second orientation state thereof.

9. The apparatus according to claim 8, wherein said detecting means is polarizing means.

10. The apparatus according to claim 9, wherein said polarizing means is a pair of polarizers arranged in cross nicols.

11. The apparatus according to claim 1, wherein said ferroelectric liquid crystal is a smectic liquid crystal having at least two stable orientation states.

12. The apparatus according to claim 11, wherein said smectic liquid crystal is a chiral smectic liquid crystal.

13. The apparatus according to claim 12, wherein said chiral smectic liquid crystal has a non-spiral structure.

14. The apparatus according to claim 12, wherein said chiral smectic liquid crystal is in chiral smectic C phase, H phase, I phase, J phase, K phase, G phase or F phase.

15. The apparatus according to claim 1, wherein said electroconductive member forms a transparent electrode.

16. The apparatus according to claim 1, wherein said electric charge-accepting member is a film of an organic insulating material or an inorganic insulating material.

17. The apparatus according to claim 1, wherein the electric field applied to the ferroelectric liquid crystal has an intensity of $0.5 \times 10^6$ V/m to $10 \times 10^6$ V/m.

* * * * *